(12) United States Patent
Wang

(10) Patent No.: US 6,876,805 B2
(45) Date of Patent: Apr. 5, 2005

(54) MULTIPLE MODE FIBER WITH MODE DISCRIMINATION

(75) Inventor: Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 45 days.

(21) Appl. No.: 10/238,089

(22) Filed: Sep. 9, 2002

(65) Prior Publication Data

US 2004/0047577 A1 Mar. 11, 2004

(51) Int. Cl.[7] .............................. G02B 6/26; G02B 6/02
(52) U.S. Cl. ......................... 385/125; 385/28; 385/126
(58) Field of Search .......................... 385/28, 29, 123, 385/125, 126

(56) References Cited

U.S. PATENT DOCUMENTS

| 5,261,016 A | * | 11/1993 | Poole | 385/28 |
| 5,485,296 A | * | 1/1996 | Healey et al. | 398/40 |
| 5,828,802 A | * | 10/1998 | Stolen et al. | 385/27 |
| 6,404,966 B1 | * | 6/2002 | Kawanishi et al. | 385/125 |
| 2001/0024557 A1 | * | 9/2001 | Hasegawa et al. | 385/125 |
| 2002/0034362 A1 | * | 3/2002 | Yamazaki et al. | 385/80 |

* cited by examiner

Primary Examiner—John D. Lee
Assistant Examiner—Tina M Lin
(74) Attorney, Agent, or Firm—Workman Nydegger

(57) ABSTRACT

An optical fiber for reducing modal dispersion and increasing both travel distance and transmission speed. A core center is formed in the core of the optical fiber. The core center is doped with impurities, is hollow, or is pulled at a lower temperature to increase diffraction of the core center. The core center discriminates the low order modes such that only the high order modes are present in the optical fiber. Because the low order modes are absorbed or otherwise discriminated against, the range of propagation constants is reduced and modal dispersion is likewise reduced. High order modes can be launched in the optical fiber using a lens whose center portion is obscured or by using a diffractive lens to couple a source to the optical fiber.

21 Claims, 3 Drawing Sheets

MULTIPLE MODE FIBER WITH MODE DISCRIMINATION

BACKGROUND OF THE INVENTION

1. The Field of the Invention

The present invention relates to optical fibers. More particularly, the present invention relates to multiple mode optical fibers that discriminate against lower order modes such that modal dispersion is reduced and travel distance is increased.

2. Background and Relevant Art

Most optical fibers have the same general structure. The center portion of the optical fiber is the core, which is surrounded by cladding material or a cladding layer. The cladding layer is enclosed in a protective casing. The core of the optical fiber has a refractive index that is higher than the refractive index of the cladding material that surrounds the core. The difference between the refractive index of the core and the refractive index of the cladding material ensures that the light travels through the core of the optical fiber. The optical fiber is effectively a waveguide for light signals or rays.

In optical fibers, the relative sizes or dimensions of the core and of the cladding can vary widely. However, the number of modes that are supported by an optical fiber typically increases as the diameter of the core increases. Thus, optical fibers with small cores support few modes and are often referred to as single mode fibers because they only support one mode, while optical fibers with larger core diameters can support multiple modes. A standard diameter of the core and the cladding material is 125 micrometers, although other sizes are available. However, the diameter of the core will vary and may depend on whether the optical fiber is a single mode optical fiber or a multimode optical fiber.

There are two general types of optical fibers: step index optical fibers and graded index optical fibers. A step index fiber has a definite boundary between the core of the optical fiber and the cladding material or layer where the refractive index suddenly changes. Each mode supported by a step index fiber has its own characteristic velocity or propagation constant. For this reason, pulses of light tend to expand or spread out as they travel through the optical fiber, a phenomenon known as modal dispersion. The modal dispersion is related to both the number of modes supported by the optical fiber and the length of the optical fiber. The modal dispersion increases as the number of supported modes increases and also increases in longer optical fibers. Modal dispersion is also affected by vibrations, temperature, and the like. A practical implication of modal dispersion is that the information encoded in the optical signal can be lost. In particular, low order modes, which typically travel faster, can overtake the slower high order modes that were transmitted at an earlier point in time. As a result, the distances with which conventional multimode optical fibers can be used have been limited.

Because modal dispersion limits the data capacity of step index optical fibers, graded index multimode fibers have been developed. In a step index multimode fiber, there is an abrupt change in refractive index at the boundary between the cladding and the core. A graded index multimode fiber, in contrast, does not have a sudden change in the refractive index. Rather, the refractive index gradually decreases away from the center of the optical fiber. Instead of internal reflection, the light traveling in a graded index multimode fiber is guided by refraction.

In both step index multimode fibers and graded index multimode fibers, light rays follow different paths and occupy different modes. The advantage afforded by the graded index multimode fiber is that light rays that are furthest away from the center of the core travel at a greater velocity than rays that are closer to the core. The difference in velocity is not large, but it is sufficient to compensate for the longer distance that is traveled by the light rays that are furthest from the core. Modal dispersion, the difficulty in fabricating a graded index multimode fiber, and other problems such as mode partition noise limit the effectiveness of graded index multimode fibers in high-speed multimode links. Graded index multimode optical fibers are also costly.

An 850 nanometer multimode fiber communication system that uses step index multimode optical fibers, for example, is a modal dispersion limited system that limits the travel distance of light waves to 220 meters at 1.25 Gigabits per second. The travel distance can be improved using graded index multimode optical fibers, but the systems is still subject to modal dispersion as well as limited by the inherent imperfections that exist in graded index multimode fibers and that limit the travel distance.

BRIEF SUMMARY OF THE INVENTION

These and other limitations of the prior art are overcome by the present invention which is directed to a multimode fiber with modal discrimination. The present invention is also directed to launching high order modes in an optical fiber. When light from a source is coupled with a multimode optical fiber, more than one mode is typically launched. The low order modes often have propagation constants that are larger in magnitude than the propagation constants of the high order modes. The present invention reduces or eliminates the low order modes such that the range of propagation constants are closer in magnitude. Because the range of propagation constants is reduced, modal dispersion is also reduced and both the travel distance and transmission speed of the optical fiber are increased.

The optical fiber of the present invention includes a core that is surrounded by a cladding layer or material. The core includes a center core and an outer core. Because low order modes spend proportionally more time in the center core than the high order modes, the core center can be altered to reduce or eliminate the low order modes without affecting the propagation of the high order modes. In fact, the travel distance of the optical fiber is often increased because the modal dispersion effect has been reduced by the core center.

In one example, the core center is hollow. Alternatively, the core center can be doped with an impurity such as iron, erbium, or other absorbing material. The core center may also be pulled at a lower temperature during manufacture in order to increase the diffraction of the core center. Be altering the core center as described, the optical fiber discriminates against the low order modes and reduced the modal dispersion of the light that is propagating in the optical fiber.

The high order modes can be launched in the optical fiber using a lens whose center portion is obscured. This lens only permits the high angel light rays from the source to be coupled to the optical fiber. In another example, the lens is a diffractive lens that achieves the same result.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

In communication systems that use optical fibers, mode partition noise and modal dispersion have limited the both the transmission rate and travel distance of the communication system. Modal dispersion and mode partition noise occur because light from a source such as a vertical cavity surface emitting laser or a edge emitting laser couples to many different modes. As previously indicated, the modal propagation constant of each mode is different and leads to modal dispersion.

The present invention relates to a multiple mode optical fiber that discriminates against certain modes. In particular, the present invention relates to a multiple mode optical fiber that effectively eliminates the lower order modes. The propagation constant of the remaining modes are closer together, and the effects of modal dispersion are reduced such that the travel distance and transmission speed are increased.

Figure 1:
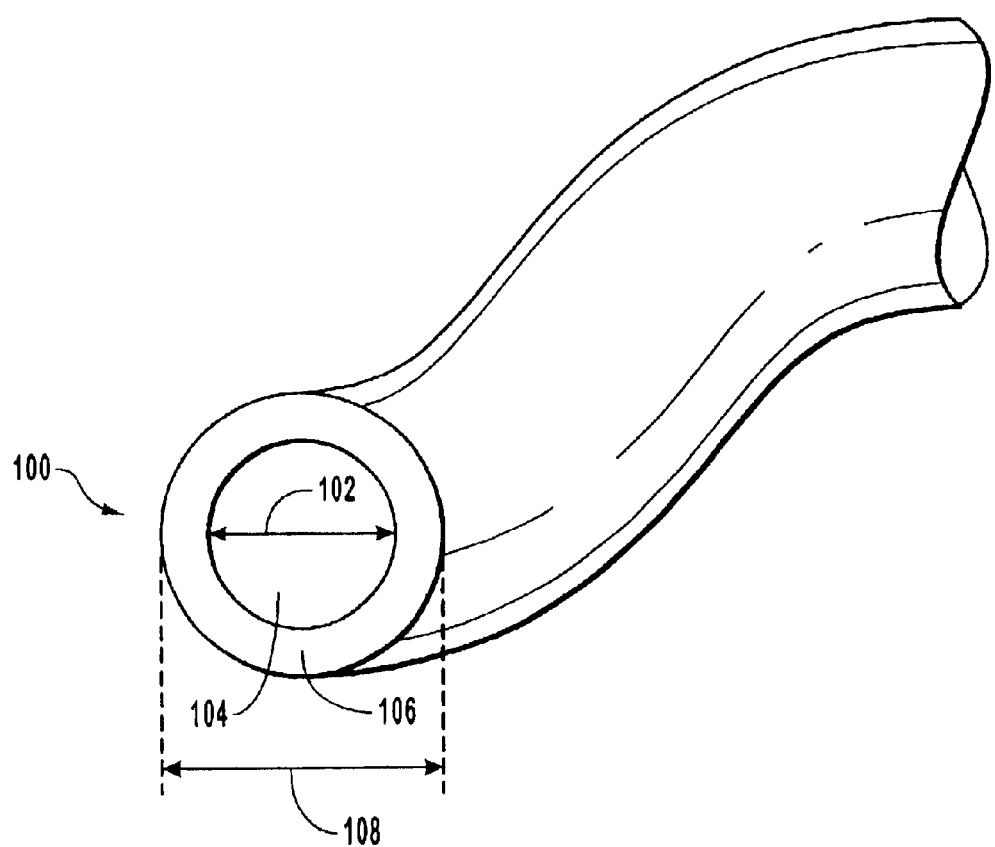
FIG. 1 illustrates an example of an optical fiber that includes a core surrounded by cladding material.

FIG. 1 illustrates an exemplary step index multimode optical fiber. The fiber 100 includes a core 104 that is surrounded by cladding 106. A typical diameter 108 of the fiber 100 is 125 micrometers. The core 104 of the multimode fiber 100 has a diameter 102 of, for example, 50 micrometers or 62.5 micrometers. Often, the fiber 100 is enclosed in plastic that protects the cladding material 106 and the core 104. The present invention is not limited to these dimensions and it is understood that the present invention can be applied to other multimode optical fibers with different dimensions.

Figure 2:
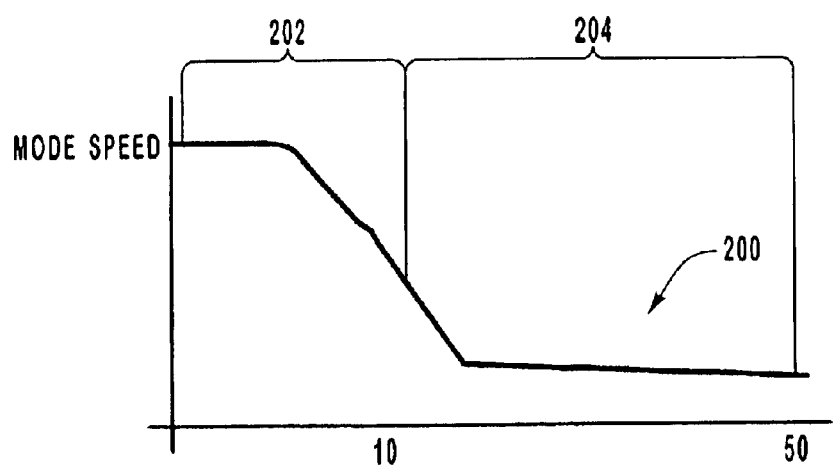
FIG. 2 is a graph that illustrates the propagation speed of the modes that are supported by an optical fiber.

FIG. 2 is a graph that plots mode speed versus mode number. The lower order modes 202 (modes 1–10, for example) have a higher propagation constant that the remaining modes 204 (modes 11 through 50, for example). The remaining modes 204 travel at essentially the same velocity in the optical fiber or have approximately the same propagation constant when compared to the lower order modes 202. The present invention discriminates against the lower order modes 202 such that the modes traveling in the optical fiber are less susceptible to modal dispersion and travel distance can be thus increases.

Figure 3:
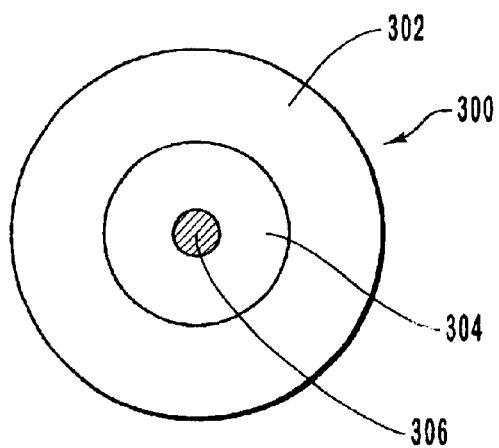
FIG. 3 is a cross sectional view of an optical fiber that includes a core center for discriminating against low order modes.

FIG. 3 is a cross section of an optical fiber in accordance with the present invention that discriminates against lower order modes. The optical fiber 300 is a form of a step index optical fiber and includes cladding 302 and a core 304. The core 304, which is the part of the fiber 300 through which light is transmitted, includes a core center 306. Whereas a graded index multimode fiber attempts to balance the propagation constant across the various modes, the optical fiber 300 discriminates against the lower modes which have higher propagation constants such that the lower order modes are eliminated.

The low order mode discrimination is achieved through the core center 306. In one embodiment, the core center 306 is hollow. In this instance, only higher order modes that do not have a field profile at the core can propagate in a fiber with a hollow core. In another embodiment, the core center 306 is doped with a lossy material. The core center 306 can be doped, for example, with Erbium (Er) or with Iron (Fe) or with other lossy materials that absorb the lower order modes.

For example, a fiber core overlap factor for different modes can be defined as:

$$\Gamma_c = \frac{\int\int F_i(x,y)C(x,y)F_i^*(x,y)dxdy}{\int\int F_i(x,y)F_i^*(x,y)dxdy}.$$

This example, C(x,y) is the loss distribution across the fiber and $F_i(x,y)$ is the field distribution, where i denotes the order of mode. The fiber fore factor of the lower order mode is higher than the fiber core factor of the higher order modes. Thus, the higher order modes are able to propagate and the lower order modes are eliminated or absorbed.

The core center 306 can also be manufactured by pulling the core center at a lower temperature or by growing the core center at a lower temperature. This increases the diffraction loss of the core center 306 such that the fiber 300 discriminates against the lower order modes.

Figure 4:
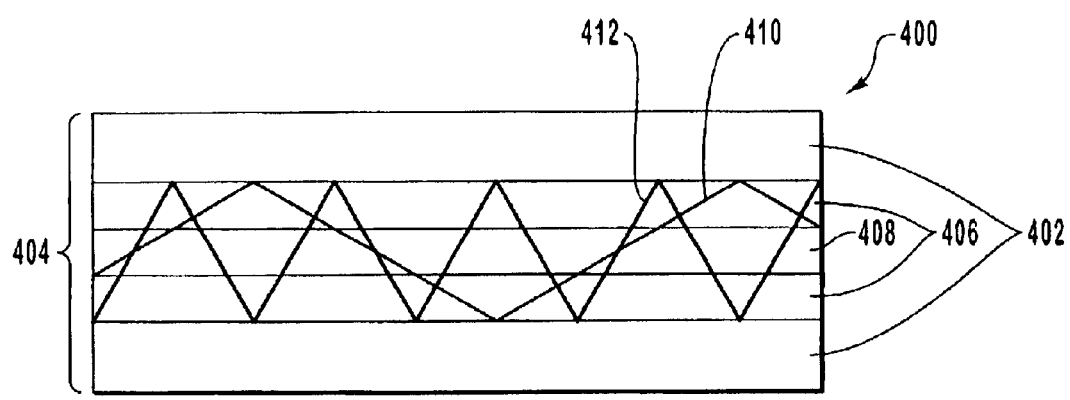
FIG. 4 illustrates the propagation paths of low order modes and of high order modes in an optical fiber.

FIG. 4 more fully illustrates the ability of the optical fiber to discriminate against lower order modes. FIG. 4 illustrates a cross section of an optical fiber that includes the propagation paths of low order modes and high order modes. The fiber 400 includes cladding 402, which surrounds the core 404. The core 404 includes the core center 408 as described above, which is surrounded by a donut shaped core portion 406.

In the fiber 400, the light is confined to the core 400 via the abrupt change in the refractive index at the border of the core 404 and the cladding 402. The lower order modes, represented by the path 410, typically travel faster than the high order modes, which are represented by the path 412. Because the lower order modes spend proportionally more time in the core center 408, they are absorbed, while the high order modes spend less time in the core center 404 and are not absorbed as readily. Modal dispersion is thus reduced because the high order modes, as previously described, travel at velocities that are closer to each other with respect to the low order modes.

Figure 5A:
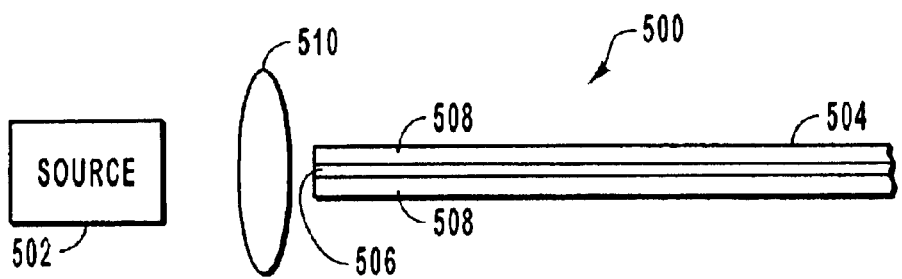
FIG. 5A illustrates a system for launching high order modes in an optical fiber.
Figure 5B:
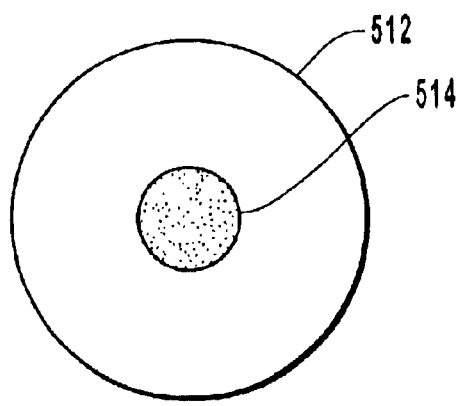
FIG. 5B illustrates a lens for use in launching high order modes.
Figure 5C:
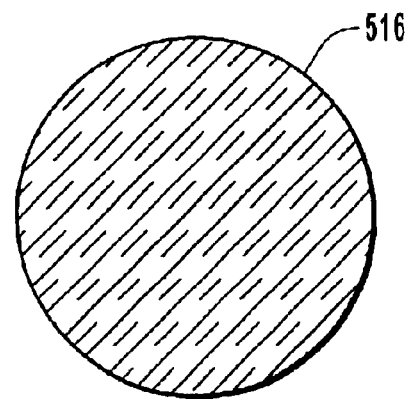
FIG. 5C illustrates a diffractive lens for use in launching high order modes.

FIGS. 5A, 5B, and 5C illustrate a system for launching higher order modes in an optical element such as an optical fiber. FIG. 5A illustrates a system than launches various modes in an optical fiber. The output light of a source 502, which may be a vertical cavity surface emitting laser or an edge emitting laser, is coupled with an optical fiber 504 using a lens 510. The fiber 504 includes a core 506 as described above and cladding 508. The amount of light actually launched in the fiber 504 is dependent on the acceptance angle of the fiber 504 (typically described in terms of numerical aperture). Light that enters the fiber 504 at a small angle has a propagation path that is shorter than the propagation path of light that enters the fiber 504 at a larger at a larger angle. The core center previously described discriminates against the lower order modes such that the modal dispersion is reduced. Another advantage of the present invention is that some sources produce more power in the larger angle light rays.

FIGS. 5B and 5C illustrate exemplary lenses that assist in launching the high order modes. In FIG. 5B, the center 514 of the lens 512 has been blocked or obscured such that only the high angle light rays are incident on the fiber 504. The lens 512 thus reduces the number of low order modes that are launched. The core center 506 of the fiber 504 discriminates against the low order modes that are launched. FIG. 5C illustrates a diffractive lens 516. The diffractive properties of the lens 516 can be used to launch the high order modes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical fiber for increasing the travel distance of light propagating in the optical fiber by reducing modal dispersion, the optical fiber comprising:

a cladding layer that surrounds a core, wherein the core has a refractive index that is higher than a refractive index of the cladding layer and wherein the core supports multiple modes; and a core center formed in the core, wherein the core center discriminates against low order modes such that the low order modes are absorbed whereby modal dispersion is reduced; and wherein the core center has a diffraction loss that is greater than aa diffraction loss of the outer core.

2. An optical fiber as defined in claim 1, wherein the core center is hollow.

3. An optical fiber as defined in claim 1, wherein the core center is doped with an impurity.

4. An optical fiber as defined in claim 3, wherein the impurity is at least one of iron and erbium.

5. An optical fiber as defined in claim 3, wherein the impurity is a material that absorbs light.

6. An optical fiber as defined in claim 1, wherein the core center has a diameter on the order of 10 microns.

7. An optical fiber for increasing the travel distance of light propagating in the optical fiber by reducing modal dispersion, the optical fiber comprising:

a cladding layer that surrounds a core, wherein tho core has a refractive index that is higher than a refractive index of the cladding layer and wherein the core supports multiple modes;

a core center formed in the core, wherein the core center discriminates against low order modes such that the low order modes are absorbed whereby modal dispersion is reduced; and wherein the core center has a diffraction loss that is greater than a diffraction loss of the outer core, and the diffraction loss of the core center is increased by pulling the core center at a low temperature.

8. A method for launching high order modes in an optical communication system such that the modal dispersion of light propagating in the optical communication system is reduced, the method comprising:

forming an optical fiber, wherein the optical fiber includes a core and a cladding, wherein the cladding surrounds the core;

forming a core center in the core that discriminates against low order modes, wherein the core center reduces the modal dispersion of the light propagating in the optical fiber by absorbing the low order modes;

increasing a diffraction loss of the core center; and launching light from a source into the optical fiber, wherein the low order modes are absorbed by the core center.

9. A method as defined in claim 8, wherein forming a core center in the core that discriminates against low order modes further comprises forming a core center that is hollow.

10. A method as defined in claim 8, wherein forming a core center in the core that discriminates against low order modes further comprises doping the core center with an impurity.

11. A method as defined in claim 9, wherein doping the core center with an impurity further comprises doping the core center with iron or erbium.

12. A method as defined in claim 8, wherein launching light from a source into the optical fiber further comprises launching light through a lens.

13. A method for launching high order modes in an optical communication system such that the modal dispersion of light propagating in the optical communication system is reduced, the method comprising:

forming an optical fiber, wherein the optical fiber includes a core and a cladding, wherein the cladding surrounds the core;

forming a core center in the core that discriminates against low order modes, wherein the core center reduces the modal dispersion of the light propagating in the optical fiber by absorbing the low order modes;

increasing a diffraction loss of the core center comprising pulling the core center at a low temperature; and launching light from a source into the optical fiber, wherein the low order modes are absorbed by the core center.

14. A method for launching high order modes in an optical communication system such that the modal dispersion of light propagating in tho optical communication system is reduced, the method comprising:

forming an optical fiber, wherein the optical fiber includes a core and a cladding, wherein the cladding surrounds the core;

forming a core center in the core that discriminates against low order modes, wherein the core center reduces the modal dispersion of the light propagating in the optical fiber by absorbing the low order modes;

launching light from a source into the optical fiber through a lens, wherein the low order modes are absorbed by the core center; and wherein launching light through the lens further comprises blocking a center portion of the lens such that fewer low order modes are launched in the optical fiber.

15. A method for launching high order modes in an optical communication system such that the modal dispersion of light propagating in the optical communication system is reduced, the method comprising:

forming an optical fiber, wherein the optical fiber includes a core and a cladding, wherein the cladding surrounds the core;

forming a core center in the core that discriminates against low order modes, wherein the core center reduces the modal dispersion of the light propagating in the optical fiber by absorbing the low order modes;

launching light from a source into the optical fiber through a lens, wherein the low order modes are absorbed by the core center; and wherein launching light through the lens further comprises launching light through a diffractive lens such that fewer low order modes are launched in the optical fiber.

16. In an optical communication system where modal dispersion between low order modes and high order modes of light that is launched in the optical communication limits a travel distance of the light, an optical fiber for increasing a travel distance of light propagating in the optical fiber by reducing the modal dispersion, the optical fiber comprising:

a core formed from an optical material;

a cladding layer that is formed around the core such that light launched in the core propagates through the core, wherein the cladding layer has a refractive index that is lower than a refractive index of the core; and a core center formed in the core, wherein the core center balances propagation constants of modes propagating in the fiber; and wherein the core center is pulled at a lower temperature to increase diffraction of the core center, whereby low order modes are reduced.

17. An optical fiber as defined in claim 16, wherein the core center is doped with an impurity.

18. An optical fiber as defined in claim 17, wherein the impurity is a material that absorbs light propagating in the core.

19. An optical fiber as defined in claim 17, wherein the impurity is iron or erbium and wherein low order modes are absorbed by the impurity.

20. An optical fiber as defined in claim 16, wherein the core center is hollow.

21. An optical fiber as defined in claim 16, wherein the core center has a diameter on the order of 10 microns.

* * * * *

UNITED STATES PATENT AND TRADEMARK OFFICE
CERTIFICATE OF CORRECTION

PATENT NO. : 6,876,805 B2  Page 1 of 1
APPLICATION NO. : 10/238089
DATED : April 5, 2005
INVENTOR(S) : Steve Wang It is certified that error appears in the above-identified patent and that said Letters Patent is hereby corrected as shown below:

Column 2
Line 60, change "angel" to --angle--

Column 3
Line 44, before "edge" change "a" to --an--

Column 4
Line 1, after "constant" change "that" to --than--
Line 9, change "be thus increases." to --be, thus, increased.--
Line 41, change" fore" to --core--
Line 58, after "core" change "400" to --404--
Line 65, after "core center" change "404" to --408--

Column 5
Line 16, remove "at a larger"
Line 52, change "aa" to --a--

Column 6
Line 59, change "tho" to --the--

Signed and Sealed this

Thirty-first Day of July, 2007

JON W. DUDAS
*Director of the United States Patent and Trademark Office*